(No Model.)
J. L. CHAPMAN.
ELEVATED RAILROAD AND CAR.
No. 379,681. Patented Mar. 20, 1888.
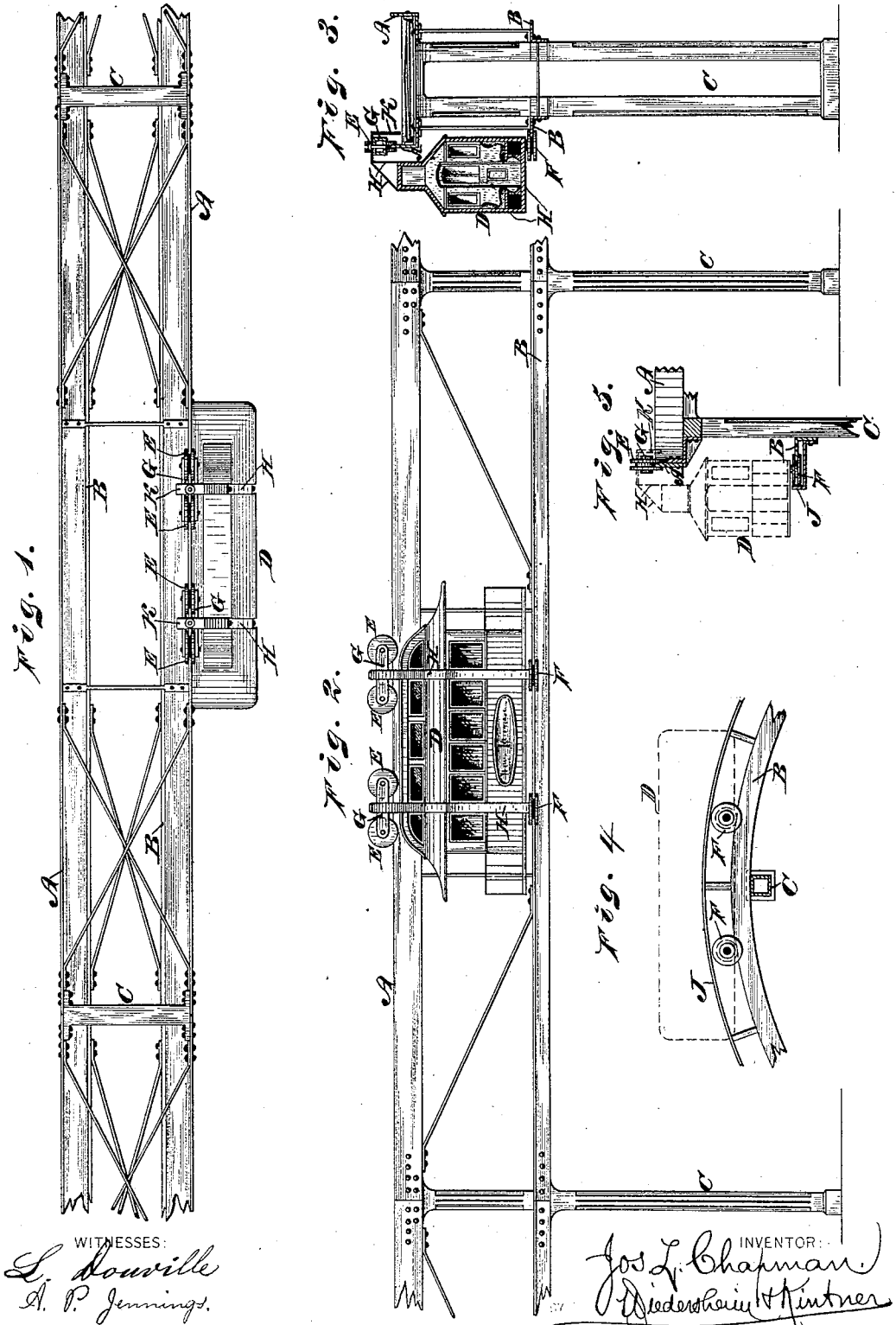
WITNESSES:
L. Douville
A. P. Jennings.
INVENTOR:
Jos. L. Chapman
Wiederscheim & Kintner
ATTORNEY.

UNITED STATES PATENT OFFICE.

JOSEPH L. CHAPMAN, OF HADDONFIELD, NEW JERSEY.

ELEVATED RAILROAD AND CAR.

SPECIFICATION forming part of Letters Patent No. 379,681, dated March 20, 1888.

Application filed June 28, 1887. Serial No. 242,740. (No model.)

*To all whom it may concern:*

Be it known that I, JOSEPH L. CHAPMAN, a citizen of the United States, residing at Haddonfield, in the county of Camden, State of New Jersey, have invented a new and useful Improvement in Elevated Railroads and Cars, which improvement is fully set forth in the following specification and accompanying drawings.

My invention relates to improvements in elevated railways and cars; and it consists, first, in providing a car with a bar or strap to which is pivotally secured the truck carrying the vertical wheels of the car.

It further consists of the combination of parts, as hereinafter fully set forth and claimed.

Figure 1 represents a top or plan view of an elevated railroad and car embodying my invention. Fig. 2 represents a side elevation thereof. Fig. 3 represents a vertical section thereof. Fig. 4 represents a top view of the car-wheels, a curved track and guard, and a horizontal section of the supporting-column. Fig. 5 represents a vertical section of a modification thereof.

Similar letters of reference indicate corresponding parts in the several figures.

Referring to the drawings, A represents an upright or vertically-arranged railroad-track, and B represents a horizontally-arranged railroad-track which is below the track A, both tracks being secured to the bed or structure of an elevated road, which is properly sustained on columns C. Each side of the road is shown as provided with tracks A B, but either set may be dispensed with, as desired.

D represents a car, having wheels E at top and wheels F at bottom, the wheels E being mounted on trucks G, which are pivoted to bars, straps, or hangers H, firmly attached to the body of the car, said wheels running on the upper track, A. The wheels F have their axles mounted on bearings attached at the bottom of the car. For purposes of strength, straps, such as H, are passed around the body of the car and firmly secured thereto, forming connections for the wheels E F.

The tracks A B are curved where required, in which case a guard-rail, J, is secured to the road, so that the lower car-wheels, F, run between said guard-rail and the lower track, B, the wheels running freely against the guard-rail, so that they are prevented from leaving their tracks.

Connected with the hangers H are guard-pieces K, which overhang the track A, so as to occupy a position on the inner side thereof, as will be seen in Fig. 3, whereby, should the wheels jump the track, said guards K take hold of the track A and serve to support the car and prevent dropping thereof.

The car may be propelled by any suitable motor, and, owing to its two sets of wheels, runs easily and smoothly on the tracks A B, the latter readily supporting the car at top and bottom and retaining it in position. Owing to the pivotal trucks G the car may vibrate without straining the trucks, and the trucks may yield when the car runs on curved tracks, so as to conform to the curvature thereof.

I am aware that it is not new to construct a car having both vertical and horizontal wheels, whereby it is adapted to be run both upon a vertical and a horizontal track; neither is it new to locate said vertical wheels so that the car depends from the track, and such constructions I do not claim.

Having thus described my invention, what I claim as new, and desire to secure by Letters Patent, is—

1. The car D, having the strap H, in combination with the truck G, pivotally connected to said strap and carrying the vertical wheels E, substantially as described.

2. The car D, with strap H, in combination with the truck G, connected to said strap, the rail A, and the guard K, on opposite side of the rail from the car and secured to said strap, substantially as and for the purpose set forth.

3. The car D, having the horizontal wheel F, in combination with the track B, and having a suitable road-bed, and the guard-rail J on opposite side of the wheel F from said track B and secured to said road-bed, substantially as and for the purpose set forth.

JOSEPH L. CHAPMAN.

Witnesses:
JOHN A. WIEDERSHEIM,
JAS. F. KELLY.